United States Patent
Cohn et al.

(10) Patent No.: US 11,176,558 B1
(45) Date of Patent: Nov. 16, 2021

(54) SYSTEMS AND METHODS FOR ELECTRONIC SCHEDULING OF PAYMENT TRANSACTION SUBMISSIONS OVER ELECTRONIC NETWORKS

(71) Applicant: Vantiv, LLC, Symmes Township, OH (US)

(72) Inventors: William H. Cohn, Lexington, MA (US); Sunil Dixit, Newton, MA (US); Fengzhong Wang, Brookline, MA (US)

(73) Assignee: Worldpay, LLC, Symmes Township, OH (US)

( * ) Notice: Subject to any disclaimer, the term of this patent is extended or adjusted under 35 U.S.C. 154(b) by 517 days.

(21) Appl. No.: 15/334,054

(22) Filed: Oct. 25, 2016

(51) Int. Cl.
*G06Q 20/40* (2012.01)

(52) U.S. Cl.
CPC ........ *G06Q 20/405* (2013.01); *G06Q 20/40* (2013.01)

(58) Field of Classification Search
None
See application file for complete search history.

(56) References Cited

U.S. PATENT DOCUMENTS

| 7,142,527 | B2 * | 11/2006 | Garcia-Luna-Aceves | H04L 12/43 370/336 |
| 8,160,960 | B1 * | 4/2012 | Fei | G06Q 40/10 705/39 |
| 8,725,634 | B2 * | 5/2014 | Fellerman | G06Q 20/40 705/39 |
| 2003/0144933 | A1 * | 7/2003 | Huang | G06Q 30/02 705/35 |
| 2007/0063017 | A1 * | 3/2007 | Chen | G06Q 20/40 235/379 |
| 2014/0032491 | A1 * | 1/2014 | Neerincx | G06F 16/23 707/610 |
| 2018/0018667 | A1 * | 1/2018 | Howe | G06Q 20/405 |

FOREIGN PATENT DOCUMENTS

EP 1950681 A1 * 7/2008 ............. G06F 21/88

OTHER PUBLICATIONS

D. K. Gifford, L. C. Stewart, A. C. Payne and G. W. Treese, "Payment switches for open networks," Digest of Papers. COMPCON' 95. Technologies for the Information Superhighway, 1995, pp. 26-31, doi: 10.1109/CMPCON. 1995.512359. (Year: 1995).*

* cited by examiner

*Primary Examiner* — Matthew S Gart
*Assistant Examiner* — Tiera J Fletcher
(74) *Attorney, Agent, or Firm* — Bookoff McAndrews, PLLC

(57) ABSTRACT

A method for payment submission scheduling includes receiving, at an acquirer computing system, an authorization request submitted by a merchant computing system for a transaction, the merchant computing system being associated with a merchant, and the authorization request identifying account information for an account that is associated with a payment card network and an issuer processor; generating a submission schedule to submit the authorization request based on a dataset of historical processing results, the submission schedule identifying a time slot within which the submitted authorization request is to be transmitted to the issuer processor; and transmitting, by the acquirer computing system to an issuer processor, the authorization request, within the time slot identified by the submission schedule.

14 Claims, 9 Drawing Sheets

SYSTEMS AND METHODS FOR ELECTRONIC SCHEDULING OF PAYMENT TRANSACTION SUBMISSIONS OVER ELECTRONIC NETWORKS

TECHNICAL FIELD

The present disclosure relates generally to the field of electronic transaction processing and, more particularly, to electronic scheduling of payment transaction submissions over electronic networks.

BACKGROUND

Electronic transactions and networks are used for a great number of purchases and sales between merchants and credit cardholders. A normal card transaction may involve a number of parties, including an account holder who possesses a card, a merchant, an acquirer processor, an issuer processor, an issuer financial institution, and a card association network. Millions of such transactions occur daily at merchants using a variety of payment card types, such as credit cards, debit cards, prepaid cards, and so forth. A transaction based on account information received from an account holder may be declined for a number of different reasons, such as non-sufficient funds, card expiration, expired account information, or a variety of other occurrences. Declined transactions may lead to a variety of undesirable outcomes for the merchant and the account holder. Conventional methods for submitting electronic transactions may submit such transactions according to factors specific to the acquirer processor or to the merchant, but do not consider the likelihood of a successful authorization at the time the electronic transaction is to be submitted.

The present disclosure is directed to overcoming one or more of these above-mentioned drawbacks.

SUMMARY

According to certain aspects of the present disclosure, systems and methods are disclosed for electronic scheduling of payment transaction submissions over an electronic payments network.

In one embodiment, a computer-implemented method is disclosed for electronic scheduling of payment transaction submissions over an electronic payments network. The method includes: receiving, at an acquirer computing system, an authorization request submitted by a merchant computing system for a transaction, wherein the merchant computing system is associated with a merchant, wherein the authorization request identifies account information for an account that is associated with a payment card network and an issuer processor; generating a submission schedule to submit the authorization request based on a dataset of historical processing results, wherein the submission schedule identifies a time slot within which the submitted authorization request is to be transmitted to the issuer processor; and transmitting, by the acquirer computing system to an issuer processor, the authorization request, within the time slot identified by the submission schedule.

In accordance with another embodiment, a system is disclosed for scheduling payment transaction requests. The system comprises: a memory having processor-readable instructions stored therein; and a processor configured to access the memory and execute the processor-readable instructions, which when executed by the processor configures the processor to perform a plurality of functions, including functions to: receive, at an acquirer computing system, an electronic transaction request submitted by a merchant computing system for a transaction, wherein the merchant computing system is associated with a merchant, wherein the electronic transaction request identifies account information for an account that is associated with a payment card network and an issuer processor; generate a submission schedule to submit the electronic transaction request based on a dataset of historical processing results, wherein the submission schedule identifies a time slot within which the submitted electronic transaction request is to be transmitted to the issuer processor; and transmit, by the acquirer computing system to an issuer processor, the electronic transaction request, within the time slot identified by the submission schedule.

In accordance with another embodiment, a non-transitory machine-readable medium is disclosed that stores instructions that, when executed by a computer, cause the computer to perform a method for scheduling payment transaction requests. The method includes: receive, at an acquirer computing system, an electronic transaction request submitted by a merchant computing system for a transaction, wherein the merchant computing system is associated with a merchant, wherein the electronic transaction request identifies account information for an account that is associated with a payment card network and an issuer processor; generate a submission schedule to submit the electronic transaction request based on a dataset of historical processing results, wherein the submission schedule identifies a time slot within which the submitted electronic transaction request is to be transmitted to the issuer processor; and transmit, by the acquirer computing system to an issuer processor, the electronic transaction request, within the time slot identified by the submission schedule.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
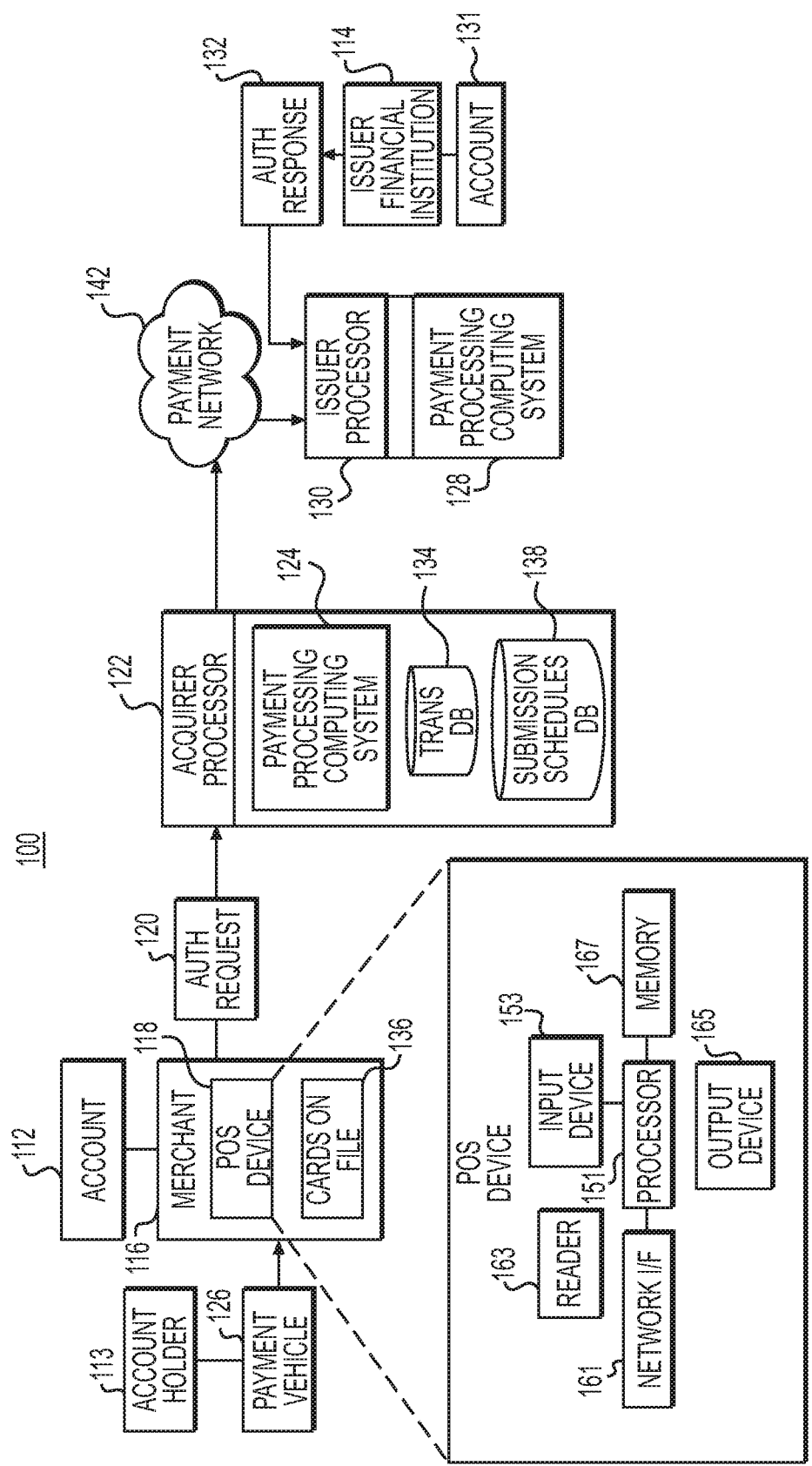
FIG. 1 depicts a block diagram of an example payment system and network in which electronic payment submission scheduling is performed, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for the scheduling of transaction payment requests.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), and the like. Payment vehicles may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile wallet or by near field communication (NFC).

As described above, declined transaction payment requests may lead to undesirable outcomes, and associated increased costs, for merchants and account holders. Thus, the embodiments of the present disclosure are directed to improving (i.e., increasing) the successful authorization of transaction payment requests. Furthermore, embodiments of the present disclosure provide for automatic scheduling of transaction payment requests based on historical transaction payment processing results in order to increase the likelihood of successful authorization of the transaction payment requests.

Some merchants have a need to utilize recurring transactions to periodically collect funds from a consumer. Examples include health club memberships, insurance premiums, subscription fees, and so forth. For convenience, the merchant may accept payment for an initial transaction using a payment vehicle that is received from the consumer. At a later point in time, and sometimes based on a particular payment schedule, the merchant may utilize account information received during the initial transaction to initiate a second transaction. These recurring billing arrangements may be used, for example, when a consumer agrees to pay a regular monthly, quarterly, or annual fee for a product, service, or membership. In some cases, the dollar amount of each charge may vary depending on the product or service. Because of supporting recurring transactions, merchants realize several benefits, such as timely payments, reduced processing time/cost, and lower risk of error due to manual entry.

Recurring billing may also be used to in the context of installment billing plans, which allow a consumer to purchase a product in a defined number of installments, typically of equal value. Examples include direct response television (DRTV) products and many catalog products. By offering installment billing, merchants may achieve increased sales of higher ticket items, timely payments, and lower risk of chargebacks.

Such recurring transactions do not rely on an immediate authorization response to the merchant, and accordingly, may be submitted to an acquirer processor in a batch transaction message comprising multiple transactions. In accordance with one or more embodiments of the present disclosure, an acquirer processor associated with the merchant may receive a batch transaction message and manage the generation of transactional messaging to the appropriate payment networks. Such transaction messaging may be generated in accordance with recurring billing information originally received from the merchant, for example. In such embodiments, the acquirer processor may maintain account information on behalf of the merchant.

In accordance with one or more embodiments, and as described in more detail below, an acquirer processor may maintain a database of past transactions and the associated authorization results. Statistical analysis or other means may be used to determine optimal time slots for batch submission of transaction payment requests based on factors associated with the transactions, including, for example, the bank identification number (BIN), the merchant categorization code (MCC), time of day, the day of the week or month, the amount of the transaction, etc. The transaction may be attempted on the current day or on a particular date in the future, at a particular point in time (or within a particular time slot), as determined at least in part by such an analysis of historical authorization success rates. According to one or more embodiments, a submission schedule may be determined for a particular payment vehicle to minimize, or at least reduce, the likelihood of a failure to obtain an approval, as there is a cost to the merchant associated with a repeated attempt.

According to one or more embodiments, one or more different payment transaction parameters may be used to determine a submission schedule, which may include determining one or more periods of time (sometimes referred to as time slots) within which an authorization should be sought. The payment transaction parameters may include, for example, a reason for a previous decline of the payment vehicle, payment vehicle parameters, the transaction amount, the merchant identifier, among other types of parameters. A submission schedule may be developed using any suitable analytical technique. In one or more embodiments, historical transaction data may be mined to determine trends related to approval ratings based on, for example, particular payment card types, particular account holder segmentation, dates of transactions, and so forth.

One or more examples of these non-limiting embodiments are illustrated in the selected examples disclosed and described in detail with reference to FIGS. 1-10 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example payment environment 100 for performing electronic scheduling of a payment submission over an electronic network. In the example payment environment 100, a payment vehicle 126 (e.g., a credit card) may be issued to an account holder 113 by an issuer financial institution 114. Issuer financial institution 114 may be any of a variety of financial institutions that is capable of issuing a payment vehicle to an account holder. Payment vehicle 126 may be used to pay a merchant 116 for a purchase transaction at a merchant point of sale (POS) device 118. Merchant POS device 118 may be any device that facilitates receipt of a payment vehicle for payment of a purchase, such as for example, a POS terminal or a web interface. Further, merchant 116 may be any type of merchant or service provider, such as, for example, a brick-and-mortar merchant, an online merchant, a mobile merchant, a kiosk, or any other type of merchant or device configured to receive payment cards, or electronic or mobile wallets, from account holders as a form of payment.

POS device 118 may be configured to interact with payment vehicle 126 to obtain account information about a consumer account affiliated with account holder 113. As shown in the depicted callout of POS device 118, in one or more embodiments, POS device 118 may include a memory 167 coupled to processor 151, which may control the operations of a reader 163, an input device 153, an output device 165, and a network interface 161. Memory 167 may store instructions for processor 151 and/or data, such as, for example, an identifier that is associated with merchant account 112.

In one or more embodiments, reader 163 may include a magnetic strip reader. In one or more embodiments, reader 163 may include a contactless reader, such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one or more embodiments, input device 153 may include key buttons that may be used to enter the account information directly into POS device 118 without the physical presence of payment vehicle 126. Input device 153 may be configured to provide further information to initiate a transaction, such as, for example, a personal identification number (PIN), password, zip code, etc., or in combination with the account information obtained from payment vehicle 126. In one or more embodiments, output device 165 may include a display, a speaker, and/or a printer to present information, such as, for example, the result of an authorization request, a receipt for the transaction, an advertisement, and so forth.

In one or more embodiments, network interface 161 may be configured to communicate with acquirer processor 122 such as, for example, via a telephone connection, an Internet connection, or a dedicated data communication channel.

In one or more embodiments, the instructions stored in memory 167 may be configured at least to cause POS device 118 to send an authorization request message to acquirer processor 122 to initiate a transaction. POS device 118 may or may not send a separate request for the clearing and settling of the transaction. The instructions stored in memory 167 also may be configured to cause POS device 118 to perform other types of functions discussed in this description.

In one or more embodiments, POS device 118 may have fewer components than those illustrated in FIG. 1. For example, in one or more embodiments, POS device 118 may be configured for "card-not-present" transactions; and POS device 118 may not have a reader 163. In one or more embodiments, POS device 118 may have more components than those illustrated in FIG. 1.

During a purchase event, merchant POS device 118 may send an authorization request 120 for the purchase transaction to acquirer processor 122 that processes payment vehicle transactions for merchant 116. Additional intermediary entities, such as one or more payment gateways, may assist with the handling and routing of authorization request 120 or other related messaging. For the purposes of illustration, such intermediary entities may be considered part of acquirer processor 122. Authorization request 120 may include identifying information from payment vehicle 126, such as a BIN number, an expiration date, and a first and last name of the account holder, for example. Authorization request 120 may further include identifying information from the purchase, such as an amount and identifying information from merchant POS device 118 and/or merchant 116, for example.

In one or more embodiments, payment vehicle 126 may be used to establish a recurring billing arrangement between account holder 113 and merchant 116. An initial transaction may allow merchant 116 to store account information that may be used for subsequent billing events. The account information may be stored in a cards-on-file storage 136. For example, the purchase event illustrated in FIG. 1 may be associated with a subscription, membership plan, installment payment plan between merchant 116 and account holder 113, and so on. For subsequent transactions, merchant 116 may access cards-on-file storage 136 to retrieve the relevant account information. The subsequent transactions may not require direct involvement from account holder 113. In one or more embodiments, account holder 113 may trigger the subsequent transaction, but may not provide payment vehicle 126 to merchant 116, as merchant 116 may access the cardholder's account information in cards-on-file storage 136.

A payment processing computing system 124 at acquirer processor 122 may receive authorization request 120 from merchant 116. Payment processing computing system 124 may translate authorization request 120, if necessary, and may provide authorization request 120 to a payment network 142. Payment network 142 may be, for example, a network of a credit card association affiliated with payment vehicle 126. Nonlimiting examples of credit card associations include VISA, MASTERCARD, DISCOVER, and AMERICAN EXPRESS, and so on. Authorization request 120 then may be provided to a payment processing computing system 128 at an issuer processor 130. In response to receiving the authorization request, and based on the type of payment vehicle 126, payment processing computing system 128 may provide authorization request 120 to issuer financial institution 114. Using information from authorization request 120, issuer financial institution 114 may associate the purchase transaction with an account 131 of account holder 113 held by issuer financial institution 114. Issuer financial institution 114 then may send an authorization response 132 which may either approve or deny the transaction. Authorization response 132 may be provided to payment processing computing system 128 at issuer processor 130 and then provided to payment network 142. Authorization response 132 then may be provided to payment processing computing system 124 at acquirer processor 122. Upon receiving authorization response 132, payment processing computing system 124 may send either an approval message or a denial message to merchant POS device 118 to complete the purchase transaction. If the purchase transaction is approved, it may be posted to account holder's account 131 and reconciled later with account holder 113 and merchant 116.

Transaction records may be stored in one or more locations within system 100. In one or more embodiments, the transaction record may be stored within a transaction data database 134 of acquirer processor 122. The transaction data may be received by transaction data database 134 from various sources, such as merchant POS device 118, merchant 116, acquirer processor 122, and so on. A plurality of transaction parameters associated with the purchase transaction may be stored in each transaction record, which may generally be used for settlement and financial recordkeeping. While the transaction parameters stored in each transaction record may vary, example transaction parameters may include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on. One or more submission schedules may also be stored in one or more locations within environment 100. In one or more embodiments, submission schedules may be stored within a submission schedules database 138 of acquirer processor 122. The submission schedules may include directives to submit the processing of a recurring payment transaction within a specified time window.

The submission schedule may, for example, identify the current day or may identify any of a day of the week for submission of one or more authorization requests, a day of the month for submission of authorization requests, or a periodic schedule for submission of authorization requests, etc. The time window may identify a period of time having a length, where the length may be, for example, less than 12 hours, less than 6 hours, less than 1 hour, or less than 30 minutes, etc.

Figure 2:
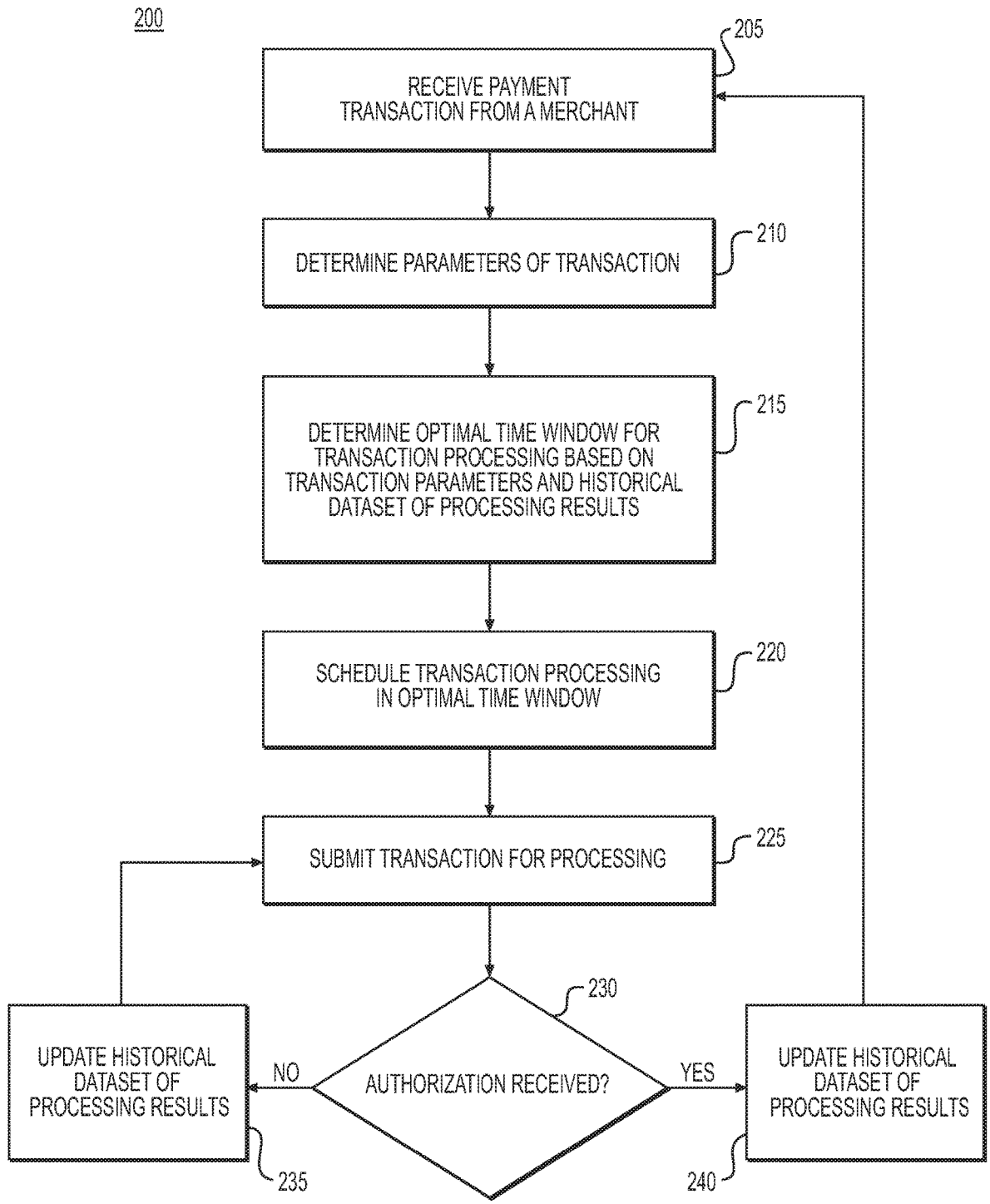
FIG. 2 is a flow chart depicting an example process for electronic payment submission scheduling, according to one or more embodiments.

FIG. 2 is a flow chart depicting a method 200 for payment submission scheduling, according to one or more embodiments. As shown in FIG. 2, operation 205 may include receiving a payment transaction from a merchant. For example, acquirer processor 122, depicted in FIG. 1 may receive authorization request 120 from merchant 116. The payment transaction may be a single payment transaction or may be multiple payment transactions transmitted together. Operation 210 may include determining parameters of the received payment transaction. If the payment transaction includes multiple payment transactions transmitted together, the determination of parameters of the received payment transaction may include sorting the payment transactions and dividing the payment transactions according to a characteristic of the payment transactions. For example, the payment transactions may be divided according to an identifier of a financial institution, such as a bank identification number (BIN). Alternatively, the payment transactions may be divided according to transaction type, time, etc. Operation 215 may include determining an optimal time window for submitting the payment transaction based on the determined payment transaction parameters and a historical dataset of processing results. The process flow for determining an optimal time window for submitting the payment transaction will be described in greater detail below with respect to FIG. 3. The historical dataset of processing results will be described in greater detail below with respect to FIG. 4. Operation 220 may include scheduling the submission of the payment transaction in the determined optimal time window. Operation 225 may include submitting the payment transaction for processing in the determined optimal time window. If an authorization failure is received at operation 230 then the method may proceed to operation 235. Operation 235 may include updating the historical dataset of processing results and returning to operation 225 to possibly resubmit the payment transaction for further processing. If an authorization success is received at operation 230 then the method may proceed to operation 240. Operation 240 may include updating the historical dataset of processing results and returning to operation 205 to receive an additional payment transaction from a merchant.

Figure 3:
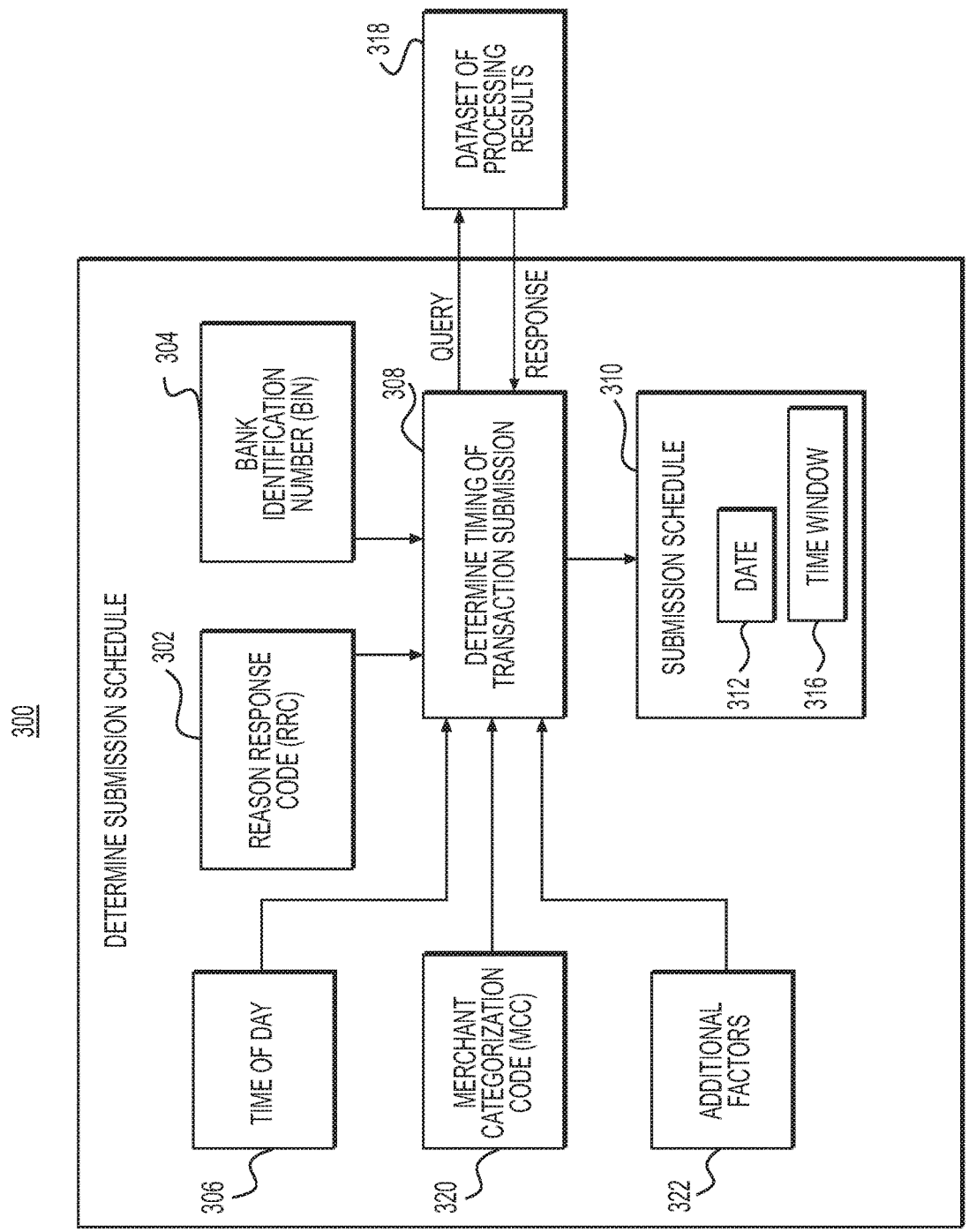
FIG. 3 depicts a block diagram of an example process logic flow and modules for electronic payment submission scheduling, according to one or more embodiments.

FIG. 3 depicts a block diagram of an example process flow for payment submission scheduling, according to one or more embodiments. The scheduling of a payment transaction submission may occur based on one or more factors including, for example, a Reason Response Code (RRC) 302 from a previous payment transaction, a Bank Identification Number (BIN) 304, a time of day 306, and a Merchant Category Code (MCC) 320. Additionally or alternatively, additional factors 322 may be used which can include, but are not limited to, fraud detection settings of issuer processor 130, Merchant Identification Number (MID), amount of transaction, payment vehicle type and/or account holder name, for example. In some embodiments, one or more of these factors may be used to determine a schedule for the submission of the payment transaction. The schedule may establish one or more time windows within which the payment transaction may be submitted. A dataset of processing results 318 may be utilized in making the timing determination. According to one or more embodiments, dataset of processing results 318 may be gathered from transaction data database 134 as shown in FIG. 1. Dataset of processing results 318 may include historical transaction data that can be correlated to one of more of the factors. The determination of the timing of one or more transactions may result in the production of a submission schedule 310. Submission schedule 310 may be built using any suitable rules, such as a date rule 312 or a time window rule 316. Date rule 312 can indicate, for example, a date of the month, a day of the week, or a number of days in the future to initiate subsequent transactions. Time window rule 316 may indicate a particular time slot that the submission of the transaction attempt should be initiated. The period of time within a given time slot may vary, but in one or more embodiments, the time slots may have approximately 20 minutes. Other embodiments may utilize larger or smaller time slots. Submission schedule 310 may be stored in submission schedules database 138.

Figure 4:
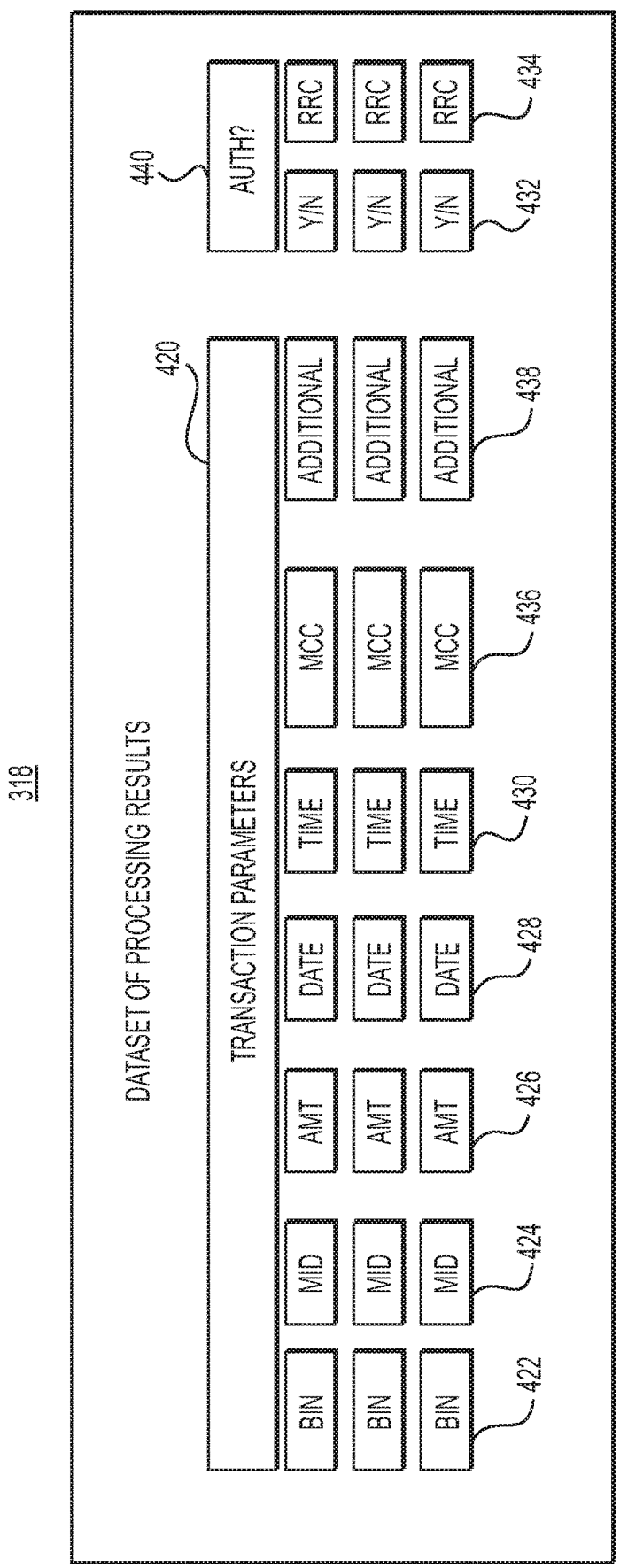
FIG. 4 depicts a dataset of processing results, according to one or more embodiments.

FIG. 4 depicts a dataset of processing results 318, according to one or more embodiments. Dataset of processing results 318 may include historical transaction information that may be processed and analyzed in order to determine submission schedule 310 as shown in FIG. 3 based on, for example, an analysis of trends and/or correlations. Dataset 318 may include transaction parameters 420 such as, for example, a BIN 422, a MID 424, a transaction amount 426, a transaction date 428, a transaction timestamp 430, an MCC 436, and additional parameters 438. Dataset 318 may also include an authorization result 440, which may indicate whether the particular combination of transaction parameters 420 led to an authorization (432) and a Reason Response Code related to the authorization result (434). Further, while dataset of processing results 318 may include many different transaction parameters 420, in some embodiments only a subset of the parameters may be used for determining submission schedule 310.

Figure 5:
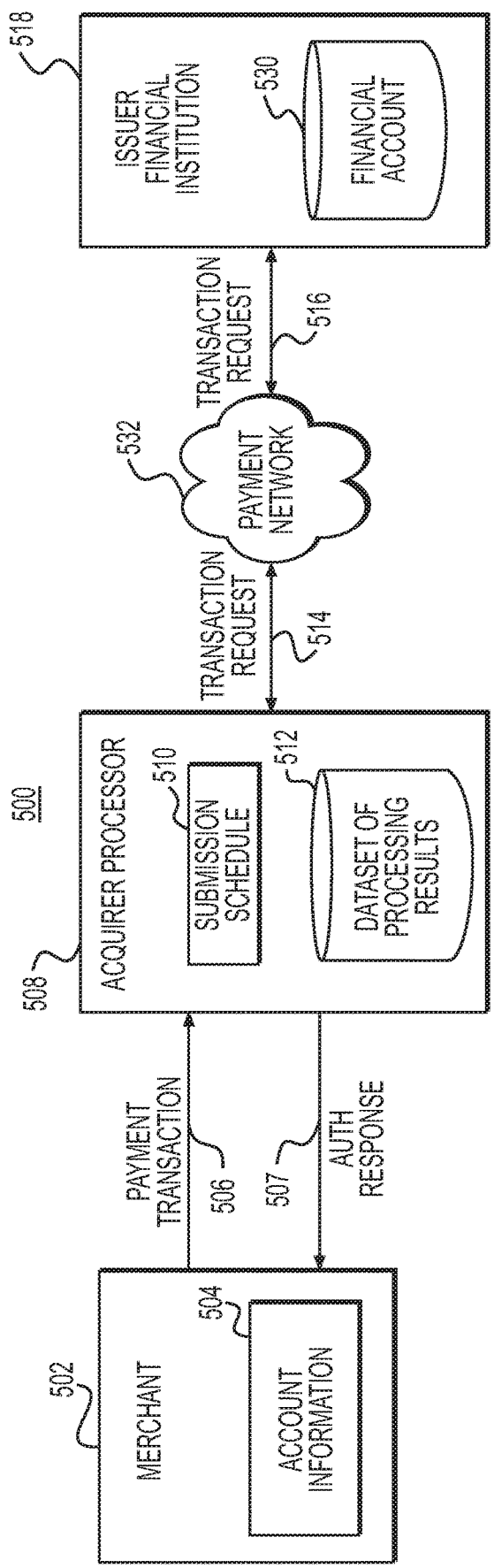
FIG. 5 depicts a block diagram of an example system and process flow for electronic payment submission scheduling, according to one or more embodiments.

FIG. 5 depicts a block diagram of an example process flow for payment submission scheduling, according to one or more embodiments. A scheduled payment transaction 506 is received from a merchant 502 by an acquirer processor 508. Scheduled payment transaction 506 may be based on account information 504 maintained by merchant 502, or elsewhere, as may be appropriate. Scheduled payment transaction 506 may include typical transaction data, such as, for example, an amount, an account identifier, a BIN, a merchant identifier, etc. At least some of the transaction data transmitted in the scheduled payment transaction may include data that was originally received by merchant 502 during an initial payment transaction originating with a payment vehicle and stored in cards-on-file storage 136, for example. A payment processing computing system of acquirer processor 508 may determine the card association that is affiliated with the scheduled payment transaction 506 (e.g., VISA, MASTERCARD, and so forth), to determine the proper processing channels for the transaction.

Acquirer processor 508 may transmit an authorization attempt or transaction request 514 to a payment network, which in turn may transmit transaction request 516 to an issuer financial institution 518. Issuer financial institution 518 may approve or reject the authorization request based on a status of a financial account 530 associated with the transaction or cardholder, or other factors, such as, for example, a transaction processing volume of financial institution 518. Acquirer processor 508 may communicate the authorization result of transaction request 516 to merchant 502 by, for example, an authorization response 507. Financial account 530 can be any suitable account, such as a DDA account, a gift card account, a prepaid account, or any other type of account that can be linked to or accessed by payment vehicle. The available account balance of financial account 530 may vary over time as the account holder withdraws funds and deposits funds. Transaction requests may be rejected, for example, for reasons associated with financial account 530, such as non-sufficient funds, out-of-date account information, etc. Acquirer processor 508 may store factors associated with transaction request 516 in dataset of processing results 512 to be used to determine a submission schedule 510 for subsequent transaction requests. As described above, factors associated with transaction request 516 may include, for example, BIN 422, RRC 434, and so forth. In accordance with one or more embodiments, submission schedule 510 may identify a date and a time slot for a subsequent transaction attempt. Acquirer processor 508 may then submit subsequent transaction requests according to submission schedule 510.

Figure 6:
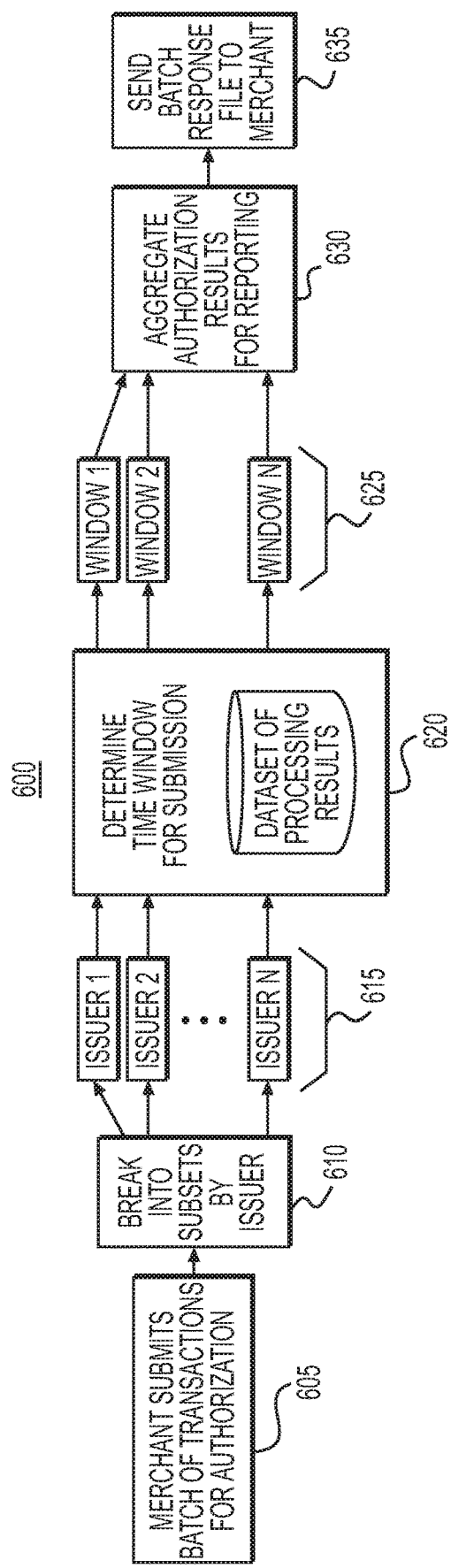
FIG. 6 depicts a block diagram of an example logic and process flow for electronic payment submission scheduling, according to one or more embodiments.

FIG. 6 depicts a block diagram of an example process flow 600 for payment submission scheduling, according to one or more embodiments. As shown in FIG. 6, at operation 605 a merchant may submit a batch of payment transactions to an acquirer processor. For example, merchant 118 depicted in FIG. 1 may submit authorization request 120, which may include a batch of multiple payment transactions requests, to acquirer processor 120. At operation 610, the acquirer processor may break the batch of submitted payment transactions into multiple subsets 615 according to corresponding issuer processor. For example, each subset 615 may correspond to a different issuer processor 130 depicted in FIG. 1. At operation 620, the acquirer processor may determine a time window 625 for submitting each subset of payment transactions together or each payment transaction within each subset separately. For example, acquirer processor 122 depicted in FIG. 1 may determine such time windows using a method, such as method 200 depicted in FIG. 2. Following submission of the payment transactions in the time windows, the acquirer processor may aggregate the authorization results for the payment transactions at operation 630 and may transmit the authorization results to the merchant as a batch results file at operation 635.

Figure 8:
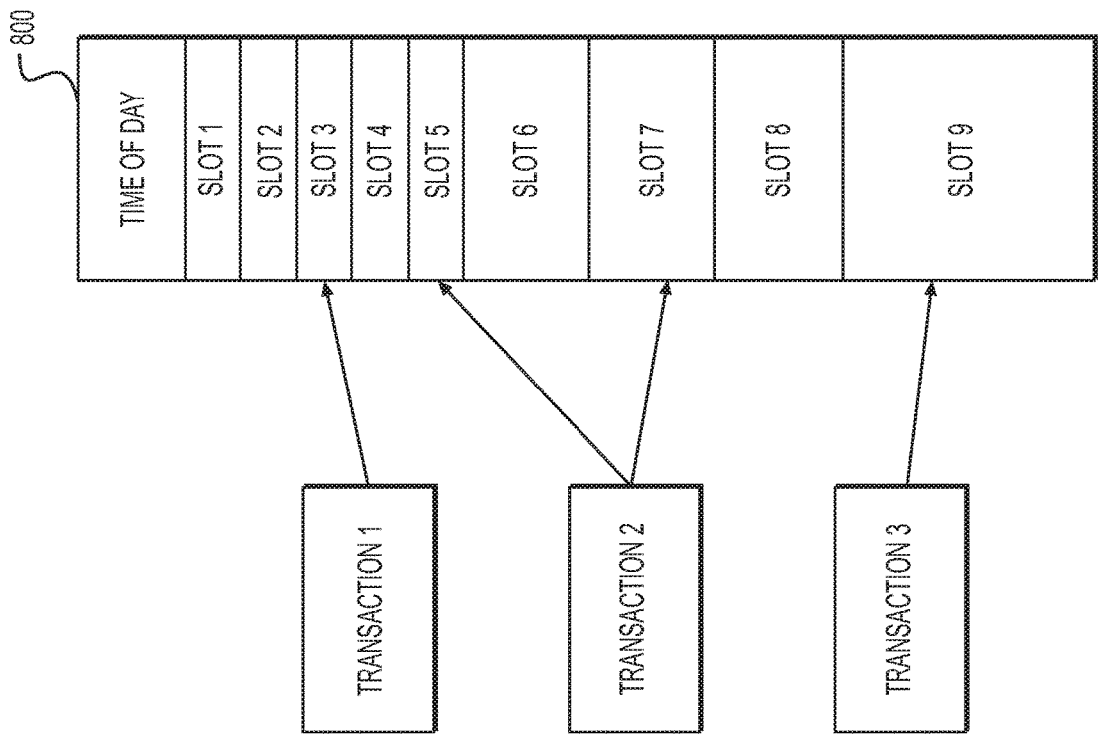
FIGS. 7-9 schematically depict examples of transaction submission time slots associated with various transactions, according to one or more embodiments.
Figure 7:
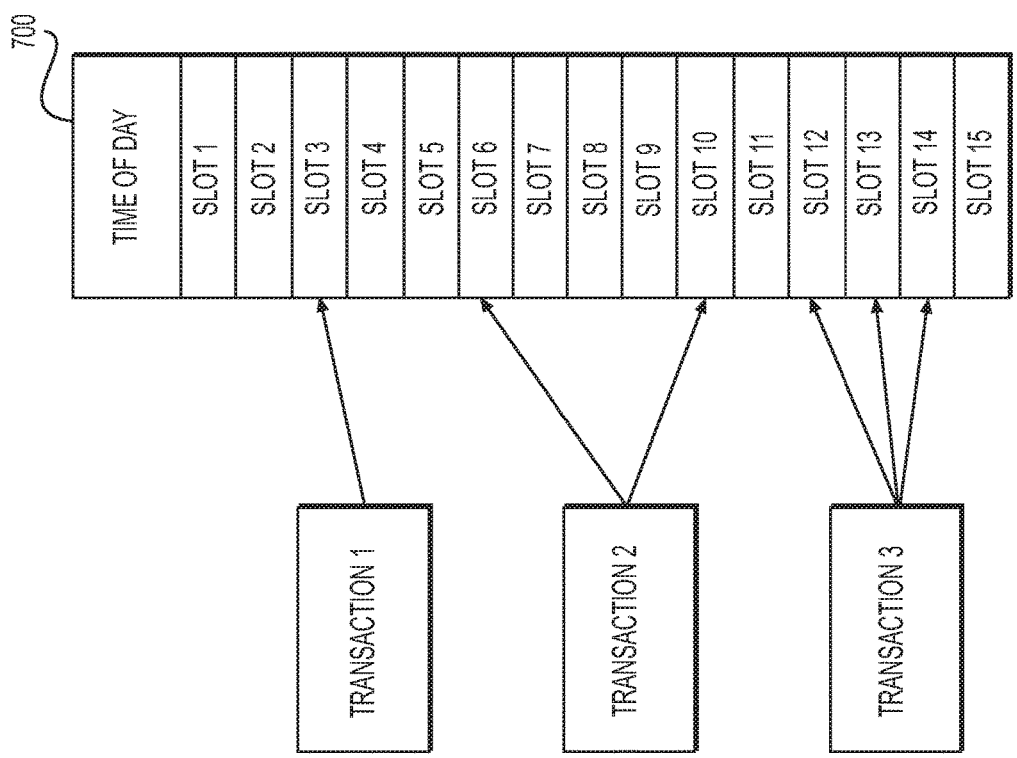
Figure 9:
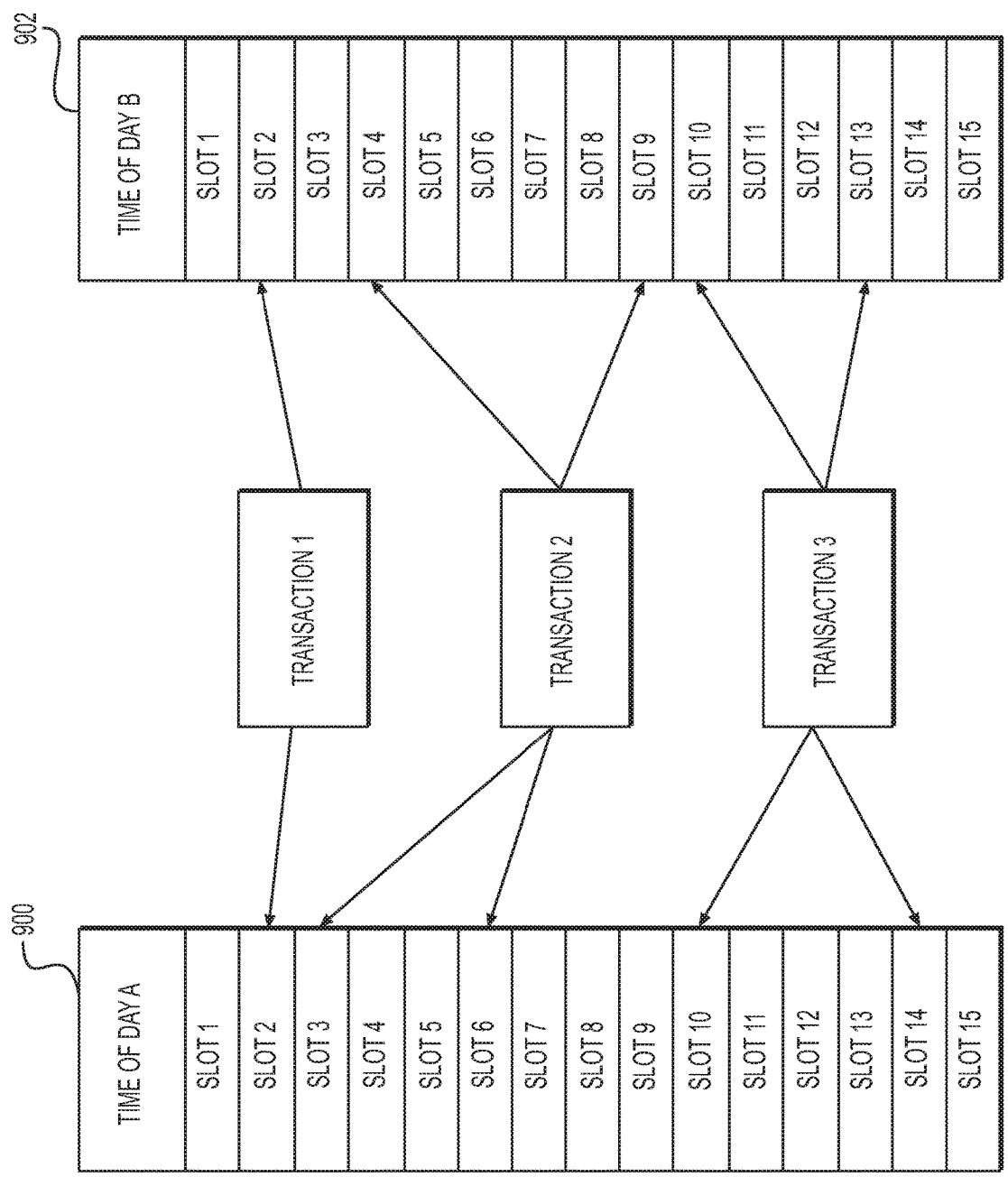

FIGS. 7-9 schematically depict examples of submission time slot configurations that are associated with various payment transactions in accordance with one or more embodiments. Referring first to FIG. 7, a day 700 is shown separated into 15 timeslots. While 15 time slots are shown, any suitable number of time slots can be implemented. By way of example, for embodiments utilizing 20-minute time slots, each day would have 72 available timeslots. Embodiments utilizing one-hour time slots would have 24 available timeslots. Depending on transaction parameters and/or other factors, various transactions can be linked to particular time slots for scheduled payment transactions. As illustrated, time slot 3 has been identified as an optimal, or at least preferred, time slot for transaction 1. In some embodiments, more than one time slot may be identified as being viable for scheduled payment transactions. Time slots 6 and 10 have been identified as optimal, or at least preferred, time slots for transaction 2. In some embodiments, for any initially submitted transaction, a block of time slots may be identified for subsequent transaction attempts. Time slots 12-14 have been identified as optimal, or at least preferred, time slots for transaction 3. As described above, the time slots identified for each transaction in FIG. 7 may be determined based on the analysis of historical data for transactions having similar parameters as the transaction to be scheduled. For example, the time slots may be at a point in the day where transaction volume tends to be lower, thereby decreasing the chance of undesirable data collisions or other processing failures.

In some embodiments, a likelihood of successful authorization of a payment transaction may be calculated for each time slot based on dataset of processing results 318, and transaction parameters for the payment transaction such as, for example, a BIN, a MID, a transaction amount, a MCC, and additional parameters, such as transaction volume in that time slot. Time slots with a greatest likelihood of successful authorization for a payment transaction may be identified as optimal time slots for submission of that payment transaction. Multiple time slots may be identified for submission of a payment transaction based on, for example, a number of time slots having the highest calculated likelihood of successful authorization or a number of time slots having a calculated likelihood of successful authorization within a specified range of the time slot having the highest calculated likelihood of successful authorization, or as a number of time slots having a calculated likelihood of successful authorization above a specified threshold. If multiple optimal time slots are identified, the identified time slots may be contiguous, such as slots 12, 13 and 14 identified for transaction 3 in FIG. 7, or the identified time slots may be discrete, such as slots 6 and 10 identified for transaction 2 in FIG. 7. The identified time slots may be prioritized according to a calculated likelihood of successful authorization of a payment transaction. Alternatively, a payment transaction may be submitted in a early optimal time slot, so as to possibly allow for resubmission of a failed transaction request in a later optimal time slot.

While FIG. 7 schematically depicts the time slots as being of similar length, this disclosure is not so limited. For example, referring to FIG. 8, the time slots depicted for the day 800 are not of equal length, with slots 6-8 having a longer duration than slots 1-5, and slot 9 having a longer duration than slot 6-8. Such time slot format may be used to reduce processing time when determining submission schedules, with the longer time slots being used when granularity does not necessarily increase likelihood of a successful authorization. By way of example, slot 9 could be the time period from 2:30 AM-5:00 AM (when processing volume is typically at a minimum) and time slots 1-5 could divide the time period from 11:00 AM to 2:00 PM (when high processing volume is typically expected).

According to one or more embodiments, a dataset of processing results may be analyzed to determine preferred time slots on a per-day basis. In other words, as shown in FIG. 9, a first set of time slots may be identified on a first day 900 (shown as Day A) and a second set of time slots may be identified on a second day 902 (shown as Day B). According to one or more embodiments, Day A may be a first day of the week and Day B may be a second day of the week. In some embodiments, Day A may represent weekdays and Day B may represent weekends days. Further, while the time slots in Day A and Day B are schematically shown as being similarly sized, it is to be appreciated that according to one or more embodiments, the time slots may vary in length.

Figure 10:
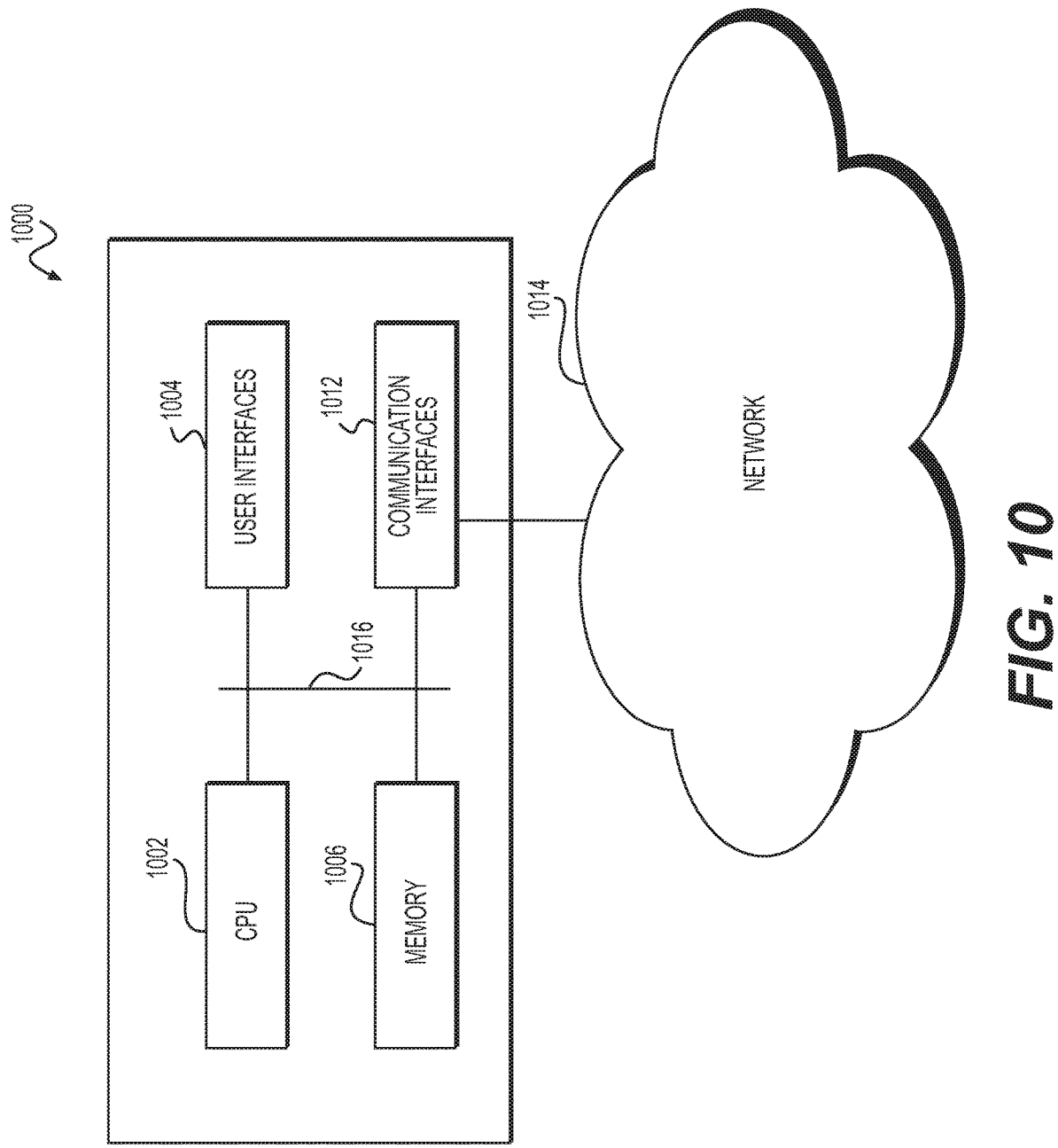
FIG. 10 depicts a computing device for electronic payment submission scheduling, according to one or more embodiments.

The processes described herein may be performed on or between one or more computing devices that are specially configured to perform the processing described herein. Referring now to FIG. 10, an example computing device 1000 is presented. A computing device 1000 may be, for example, a server, a computing device that is integrated with other systems or subsystems, a mobile computing device, a cloud-based computing capability, and so forth. The computing device 1000 can be any suitable computing device as would be understood in the art, including without limitation, for example, a custom chip, an embedded processing device, a tablet computing device, a POS device 118, a payment processing computing system 124, a payment processing computing system 128, a personal data assistant (PDA), a desktop, a laptop, a microcomputer, a minicomputer, a server, a mainframe, or any other suitable programmable device. According to one or more embodiments, a single component can be replaced by multiple components and multiple components can be replaced by a single component to perform a given function or functions. Except where such substitution would not be operative, such substitution is within the intended scope of the one or more embodiments.

The computing device 1000 may include a processor 1002 that may be any suitable type of processing unit such as, for example, a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources may further include, for example, distributed computing devices, cloud computing resources, and virtual computing resources in general, etc.

The computing device 1000 also may include one or more memories 1006 such as, for example, read only memory (ROM), random access memory (RAM), cache memory associated with the processor 1002, or other memories such as dynamic RAM (DRAM), static ram (SRAM), programmable ROM (PROM), electrically erasable PROM (EEPROM), flash memory, a removable memory card or disk, a solid state drive, and so forth. The computing device 1000 also may include storage media such as, for example, a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 1002, or memories 1006 are also contemplated as storage devices. It can be appreciated that such memory can be internal or external with respect to operation of the disclosed embodiments. It can be appreciated that certain portions of the processes described herein may be performed using instructions stored on a non-transitory computer-readable medium or media that direct a computer system to perform the process steps. Non-transitory computer-readable media, as used herein, comprises all computer-readable media except for transitory, propagating signals.

Network and communication interfaces 1012 may be configured to transmit to, or receive data from, other computing devices 1000 across a network 1014. The network and communication interfaces 1012 may be, for example, an Ethernet interface, a radio interface, a Universal Serial Bus (USB) interface, or any other suitable communications interface and can include receivers, transmitter, and transceivers. For purposes of clarity, a transceiver may be referred to as a receiver or a transmitter when referring to only the input or only the output functionality of the transceiver. Example communication interfaces 1012 may include, for example, wired data transmission links such as Ethernet and TCP/IP. The communication interfaces 1012 may include, for example, wireless protocols for interfacing with private or public networks 1014. For example, the network and communication interfaces 1012 and protocols may include interfaces for communicating with private wireless networks such as, for example, a Wi-Fi network, one of the IEEE 802.11x family of networks, or another suitable wireless network. The network and communication interfaces 1012 may include interfaces and protocols for communicating with public wireless networks 1012, using, for example, wireless protocols used by cellular network providers, including Code Division Multiple Access (CDMA) and Global System for Mobile Communications (GSM), etc. A computing device 600 may use network and communication interfaces 1012 to communicate with hardware modules such as, for example, a database or data store, or one or more servers or other networked computing resources. Data may be encrypted or protected from unauthorized access.

According to one or more embodiments, the computing device 1000 may include a system bus 1016 for interconnecting the various components of the computing device 1000, or the computing device 1000 may be integrated into one or more chips such as, for example, a programmable logic device or an application specific integrated circuit (ASIC), etc. The system bus 1016 may include, for example, a memory controller, a local bus, or a peripheral bus for supporting input and output devices 1004, and communication interfaces 1012, etc. Example input and output devices 1004 may include keyboards, keypads, gesture or graphical input devices, motion input devices, touchscreen interfaces, one or more displays, audio units, voice recognition units, vibratory devices, computer mice, and any other suitable user interface.

The processor 1002 and memory 1006 may include nonvolatile memory for storing, for example, computer-readable instructions, data, data structures, program modules, code, microcode, and other software components for storing the computer-readable instructions in non-transitory computer-readable mediums in connection with the other hardware components for carrying out the methodologies described herein. Software components may include, for example, source code, compiled code, interpreted code, executable code, static code, dynamic code, encrypted code, or any other suitable type of code or computer instructions implemented using any suitable methodology including, for example, high-level, low-level, object-oriented, visual, compiled, or interpreted programming language, etc.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for payment submission scheduling, comprising:

receiving, by a processor at an acquirer computing system, an electronic authorization request submitted by a merchant computing system for a transaction to be submitted within a specified time window, wherein the merchant computing system is associated with a merchant, wherein the electronic authorization request identifies account information for an account that is associated with a payment card network and an issuer processor;

performing, by the processor, a statistical analysis of at least one of a Bank Identification Number (BIN), a Merchant Classification Code (MCC), and a Reason Response Code (RRC) received with a denial message from a previous electronic authorization request in a database of processing results for historical electronic authorization requests of the issuer processor;

generating, by the processor, a submission schedule to submit the electronic authorization request within the specified time window based on the statistical analysis of the historical electronic authorization request processing results of the issuer processor, wherein the submission schedule identifies an optimal time slot within the specified time window within which the submitted electronic authorization request is to be transmitted to the issuer processor in order to increase a likelihood of a successful authorization of the transaction relative to a process that does not consider the likelihood of a successful authorization at a time the electronic authorization request is to be transmitted; and transmitting, by the acquirer computing system, the electronic authorization request to the issuer processor, within the optimal time slot identified by the submission schedule.

2. The method of claim 1, wherein the submission schedule identifies any of a day of the week for submission of the electronic authorization request, a day of the month for submission of the electronic authorization request, or a periodic schedule for submission of the electronic authorization request.

3. The method of claim 1, wherein the submission schedule identifies a plurality of time slots, wherein the received electronic authorization request is to be submitted in at least one of the plurality of time slots.

4. The method of claim 1, further comprising:
receiving an electronic authorization result from the issuer processor; and
updating the database of historical electronic authorization request processing results of the issuer processor using the received authorization result.

5. The method of claim 4, further comprising:
retransmitting, by the acquirer computing system to an issuer processor, the electronic authorization request when the authorization result indicates a failure of the electronic authorization request.

6. A non-transitory computer readable medium storing a program causing a computer to execute a method of payment submission scheduling, the method comprising:
receiving, by a processor at an acquirer computing system, an electronic authorization request submitted by a merchant computing system for a transaction to be submitted within a specified time window, wherein the merchant computing system is associated with a merchant, wherein the electronic authorization request identifies account information for an account that is associated with a payment card network and an issuer processor;
performing, by the processor, a statistical analysis of at least one of a Bank Identification Number (BIN), a Merchant Classification Code (MCC), and a Reason Response Code (RRC) received with a denial message from a previous electronic authorization request in a database of processing results for historical electronic authorization requests of the issuer processor;
generating, by the processor, a submission schedule to submit the electronic authorization request within the specified time window based on the statistical analysis of the historical electronic authorization request processing results of the issuer processor, wherein the submission schedule identifies an optimal time slot within the specified time window within which the submitted electronic authorization request is to be transmitted to the issuer processor in order to increase a likelihood of a successful authorization of the transaction relative to a process that does not consider the likelihood of a successful authorization at a time the electronic authorization request is to be transmitted; and
transmitting, by the acquirer computing system to the issuer processor, the electronic authorization request, within the optimal time slot identified by the submission schedule.

7. The non-transitory computer readable medium of claim 6, wherein the submission schedule identifies any of a day of the week for submission of the electronic authorization request, a day of the month for submission of the electronic authorization request, or a periodic schedule for submission of the electronic authorization request.

8. The non-transitory computer readable medium of claim 6, wherein the submission schedule identifies a plurality of time slots, wherein the received electronic authorization request is to be submitted in at least one of the plurality of time slots.

9. The non-transitory computer readable medium of claim 6, further comprising:
receiving an authorization result from the issuer processor; and
updating the database of historical electronic authorization request processing results of the issuer processor using the received authorization result.

10. The non-transitory computer readable medium of claim 9, further comprising:
retransmitting, by the acquirer computing system to an issuer processor, the electronic authorization request if the authorization result indicates a failure of the authorization request.

11. A computing system for payment submission scheduling, the computing system comprising a non-transitory computer readable medium having instructions stored thereon which when executed by a processor cause the processor to:
receive, by a processor at an acquirer computing system, an electronic authorization request submitted by a merchant computing system for a transaction to be submitted within a specified time window, wherein the merchant computing system is associated with a merchant, wherein the electronic authorization request identifies account information for an account that is associated with a payment card network and an issuer processor;
perform, by the processor, a statistical analysis of at least one of a Bank Identification Number (BIN), a Merchant Classification Code (MCC), and a Reason Response Code (RRC) received with a denial message from a previous electronic authorization request in a database of processing results for historical electronic authorization requests of the issuer processor;
generate, by the processor, a submission schedule to submit the electronic authorization request within the specified time window based on the statistical analysis of the historical electronic authorization request processing results of the issuer processor, wherein the submission schedule identifies an optimal time slot within the specified time window within which the submitted electronic authorization request is to be transmitted to the issuer processor in order to increase a likelihood of a successful authorization of the transaction relative to a process that does not consider the likelihood of a successful authorization at a time the electronic authorization request is to be transmitted; and transmit, by the acquirer computing system to the issuer processor, the electronic authorization request, within the optimal time slot identified by the submission schedule.

12. The system of claim 11, wherein the submission schedule identifies any of a day of the week for submission of the electronic authorization request, a day of the month for submission of the electronic authorization request, or a periodic schedule for submission of the electronic authorization request.

13. The system of claim 11, wherein the instructions executed by the processor further cause the processor to:
receive an electronic authorization result from the issuer processor; and
update the database of historical electronic authorization request processing results of the issuer processor using the received electronic authorization result.

14. The system of claim 13, wherein the instructions executed by the processor further cause the processor to:
retransmit, to an issuer processor, the electronic authorization request when the electronic authorization result indicates a failure of the electronic authorization request.

* * * * *